United States Patent Office 3,507,633
Patented Apr. 21, 1970

3,507,633
CIRCULAR SAW BLADE OF CHROMIUM NICKEL STEEL WITH AN OXIDE COAT
Fernand J. Dewez, Jr., Monroeville, Pa., assignor of fifty percent to James V. Alger, Monroeville, Pa.
No Drawing. Filed Apr. 17, 1967, Ser. No. 631,145
Int. Cl. B22f 5/00
U.S. Cl. 29—183
2 Claims

ABSTRACT OF THE DISCLOSURE

This invention relates generally to a saw blade and low-alloy steel composition for making the same. In more particular aspects, the invention relates to a saw blade of the circular disc-shaped type especially adapted for cutting hot metal. The saw blade is characterized by being heat treatable by austenitizing, quenching, and tempering to a hardness greater than 45 $R_c$ and is highly resistant to softening, brittle fracture, elevated-temperature deformation, and fatigue cracking during sawing. In addition, during sawing the cutting teeth of the saw blade form a tightly adherent refractory film that resists welding to the teeth of hot metal chips from the metal workpiece being sawed; this further contributes to the long service life of the saw blade. The material of the saw blade consists essentially of, in percent, 0.20 to 0.60 carbon, 0.20 to 0.80 manganese, up to 1.00 silicon, 2.00 to 4.00 nickel, 0.75 to 2.00 chromium, 0.20 to 1.00 molybdenum, up to 0.30 vanadium, and the balance iron.

---

In metal sawing, and particularly in the sawing of hot metal, it is customary to employ a circular saw blade, which may be up to 72 inches in diameter and ¾ inch thick, of plain carbon steel containing for example 0.30 to 0.60 percent carbon or an alloy steel containing for example 0.50 percent carbon, 1.00 percent nickel and 0.80 percent chromium. The saw blades typically have peripheral or circumferentially spaced cutting teeth of generally V-shape with each face of the teeth forming equal angles with the blade radius. The saw blades are usually used in the oil-quenched and tempered condition at hardness levels up to 40 $R_c$. To further improved the wear properties of the saw blades, localized sections of the periphery of the saw blades, including the teeth and root radii between the teeth, may be further hardened by flame hardening or by high-frequency electrical induction hardening. These treatments produce an untempered martensitic structure that may range in hardness from about 45 to 60 $R_c$. During cold sawing, the saw blades rotate at cutting-surface speeds not in excess of 10,000 feet per minute, whereas in hot cutting, the saw blades rotate at higher speeds often in excess of 25,000 feet per minute. In sawing cold and hot metal, hot metal chips from the sawed area are produced. In hot-metal cutting, sawing is in addition achieved in part by a melting action in the sawed metal.

During sawing of hot metal, conventional saw blades, as described above, become unserviceable after only a short time in sustained use; unserviceability results from either plastic flow or abrasive wear of the teeth of the saw or as a result of cracking on the teeth faces, which quickly results in tooth breakage, or as a result of cracking in root radii between the teeth, which may result in complete brittle failure of the saw blade. In oil-quenched and tempered saw blades having no adidtional tooth treatment, plastic flow of the relatively soft teeth readily occurs. In the saw blades having hardened teeth, as by flame or induction hardening, the teeth are tempered and softened by continued contact with the hot metal workpiece being sawed or, in the case of cold workpieces, by the frictional heat produced during sawing. As a result of this softening action imparted to the saw teeth, wear and plastic flow of the teeth also occur but at a lesser rate than with unharmed teeth. Fatigue cracks, which are caused by repeated heating and cooling of the teeth, are produced on the face of the teeth and may eventually lead to brittle failure in which teeth break off. An additional disadvantage or problem with conventional saw blades is that the hot metal chips from the workpiece, produced during sawing, tend to weld between the blade teeth to result in localized overheating of the teeth and loss of sawing action.

It is therefore the primary object of this invention to provide a saw blade that largely overcomes the disadvantages of conventional saw blades and provides longer service life, particularly in hot-sawing applications.

Another related object of the invention is to provide a safer saw blade that because of its resistance to brittle failure greatly reduce the personnel hazard typically associated with hot sawing.

A more specific object of the invention is to provide a saw blade having cutting teeth resistant to softening, to brittle fracture, to elevated temperature deformation, and to fatigue cracking during hot sawing, which greatly increases the service life of the saw blade over conventional blades.

Another object of the invention is to provide a saw blade having sawing teeth and root radii that are hardenable, as for example by flame heat treating or induction heat treating, to hardnesses greater than 45 $R_c$.

Yet another object of the invention is to provide a saw blade having teeth that are highly resistant to welding to said teeth of the hot metal chips from the metal workpiece being sawed, which serves to minimize localized overheating of the saw blade and loss of sawing action.

More specifically it is an object of the invention to provide a saw blade that forms on the cutting teeth thereof during heat treatment and sawing a tightly adherent, high-temperature formed, complex refractory film that highly resists welding to said teeth of hot metal chips from the metal workpiece being sawed.

Another more specific object of the invention is to provide a circular, disc-shaped saw blade for use in sawing metal and having circumferentially spaced sawing teeth consisting essentially of, in percent, 0.20 to 0.60 carbon, 0.20 to 0.80 manganese, up to 1.00 silicon, 2.00 to 4.00 nickel, 0.75 to 2.00 chromium, 0.20 to 1.00 molybdenum, up to .30 vanadium, and the balance iron, said blade being characterized by extremely long service life; preferably said saw-blade teeth consist essentially of, in percent, 0.25 to 0.50 carbon, 0.20 to 0.50 manganese, up to 1.00 silicon, 3.00 to 3.75 nickel, 1.00 to 1.60 chromium, 0.25 to 0.70 molybdenum, up to 0.30 vanadium, and the balance iron.

These and other objects of the invention, as well as a complete understanding thereof, may be obtained from the following description and examples.

In the practice of my invention, I have found that the desired objects may be achieved with a saw blade of a nickel, chromium, molybdenum, low-allow steel within the composition limits set forth in the following Table I.

TABLE I

|  | Broad range, percent | Preferred range, percent |
|---|---|---|
| Carbon | 0.20–0.60 | 0.25–0.50 |
| Manganese | 0.20–0.80 | 0.20–0.50 |
| Silicon | Up–1.00 | Up–1.00 |
| Nickel | 2.00–4.00 | 3.00–3.75 |
| Chromium | 0.75–2.00 | 1.00–1.60 |
| Molybdenum | 0.20–1.00 | 0.25–0.70 |
| Vanadium | Up–0.30 | Up–0.30 |
| Iron | Balance | Balance |

It is necessary that the carbon content be above about 0.20 percent to contribute to the hardness required to achieve the desired wear resistance; however, with carbon contents more than about 0.60 percent, the saw blade teeth become too brittle and fracture during service. The prescribed nickel content is critical to achieve the necessary level of fracture toughness and ductility to resist fracture of the blade teeth during service. As will be pointed out more specifically hereinafter, lower nickel contents than those set forth in Table I result in a drastic impairment of the fracture toughness of the saw blade as exemplified by Charpy V-notch impact properties. Also, if the upper limit for nickel is exceeded such will impair the elevated-temperature tensile strength. The chromium, molybdenum, and vanadium contents must be balanced in the amounts set forth in Table I to achieve the desired elevated-temperature tensile strength and resistance of the saw blade to softening during tempering treatment and sawing; the upper limits for these elements must not be exceeded to preserve toughness and ductility. The manganese content must not exceed 0.80 percent for hot sawing blades because of the onset to temper embrittlement, which drastically reduces the toughness of the saw blade. Moreover, manganese must not exceed 0.80 percent to prevent the retention of any austenite from heat treatment of the saw blade, which of course would impair hardness and toughness. Silicon may be used for deoxidation during steelmaking, but it should not exceed 1.00 percent to avoid embrittlement of the saw blade. However, silicon up to 1.00 percent will provide resistance to softening during hot sawing.

Saw blades produced from the material described above have the required excellent combination of properties as shown in Tables III through V. In these tables, the results of steels for the saw blades of the present invention are compared with conventional saw-blade steels. Specifically, in Table II steels A and B are conventional plain carbon steel and alloy steel, respectively, which are typically used in the production of saw blades for metal sawing applications. Steels C, D, E, F, and G, which are listed in Table II, are within the composition limits set forth in Table I for saw blades produced in accordance with the invention.

TABLE II.—COMPOSITION OF THE STEELS INVESTIGATED, PERCENT

| Steel | C | Mn | Si | Ni | Cr | Mo | V |
|---|---|---|---|---|---|---|---|
| A | 0.54 | 0.79 | 0.26 | (¹) | (¹) | (¹) | (¹) |
| B | 0.51 | 0.80 | 0.23 | 1.19 | 0.77 | (¹) | (¹) |
| C | 0.38 | 0.26 | 0.24 | 3.03 | 1.12 | 0.27 | (¹) |
| D | 0.37 | 0.31 | 0.04 | 3.18 | 1.13 | 0.25 | 0.10 |
| E | 0.39 | 0.30 | 0.05 | 3.06 | 1.11 | 0.25 | 0.19 |
| F | 0.38 | 0.30 | 0.04 | 3.57 | 1.54 | 0.49 | 0.09 |
| G | 0.52 | 0.32 | 0.05 | 3.58 | 1.68 | 0.50 | 0.10 |

[1] Not present except in residual amounts.

In Table III, the steels within the composition limits set forth in Table I are compared with the conventional saw-blade steels.

TABLE III

| Steel | Heat treatment | | |
|---|---|---|---|
|  | Austenitizing temp.,[1] F. | Tempering temp.,[2] F. | Hardness, $R_c$ |
| A | 1,550 | 750 | 30 |
| B | 1,550 | 950 | 37 |
| C | 1,625 | 1,150 | 32 |
| D | 1,625 | 1,150 | 37 |
| E | 1,625 | 1,150 | 37 |
| F | 1,625 | 1,150 | 42 |
| G | 1,570 | 1,150 | 42 |

| Steel | Tensile properties | | | | |
|---|---|---|---|---|---|
|  | Test temp., F. | Yield strength, p.s.i. | Tensile strength, p.s.i. | Elongation in 1 inch, percent | Reduction of area, percent |
| A | 75 | 102,000 | 138,000 | 18 | 55 |
|  | 1,000 | 42,000 | 57,000 | 36 | 89 |
| B | 74 | 15,8000 | 171,000 | 8 | 36 |
|  | 1,000 | 45,000 | 67,000 | 34 | 75 |
| C | 75 | 136,000 | 150,000 | 18 | 59 |
|  | 1,000 | 77,000 | 89,000 | 25 | 80 |
| D | 75 | 162,000 | 175,000 | 16 | 56 |
|  | 1,000 | 92,000 | 103,000 | 16 | 80 |
| E | 75 | 164,000 | 172,000 | 16 | 51 |
|  | 1,000 | 89,000 | 102,000 | 23 | 83 |
| F | 75 | 170,000 | 192,000 | 15 | 53 |
|  | 1,000 | 105,000 | 124,000 | 18 | 75 |
| G | 75 | 170,000 | 193,000 | 12 | 34 |
|  | 1,000 | 98,000 | 120,000 | 21 | 77 |

[1] All steels oil quenched from austenitizing temperature.
[2] Steel A and B tempered for 1 hour at temperature. All others tempered 2 hours at temperature.

It may be seen from the comparative data presented in this table that the steels within the composition limits of the invention have significantly improved elevated-temperature tensile strength and ductility at 1000 F. compared with conventional saw-blade steels. As discussed above, these improved properties enable the saw blades of the invention to be characterized by high resistance to deformation at the high temperatures prevailing during metal sawing.

The impact properties of saw blades produced in accordance with this invention are also significantly improved over those of conventional saw blades, as demonstrated by the data presented in Table IV.

TABLE IV

| Steel | Charpy V-notch impact properties | |
|---|---|---|
|  | 50% shear fracture transition temp., F. | Maximum energy absorbed at 100% shear, ft. lb. |
| A | 140 | 46 |
| B | −40 | 13 |
| C | −220 | 53 |
| D | −75 | 53 |
| E | −120 | 40 |
| F | −120 | 36 |
| G | −140 | 30 |

These properties permit the saw blades of the invention to resist fracture during service.

To demonstrate the resistance of the saw blades of the invention to softening during tempering, saw blades made of the conventional materials A and B were compared with saw blades of the compositions identified in Table II as steels C, D, E, F, and G by subjecting blades having cutting teeth in the as-quenched, flame-hardened condition to a furnace temperature of 1050 F. for 8 hours. This high-temperature treatment simulated the high-temperature conditions to which the saw blades are subjected during service in sawing hot metal. As may be seen from the comparison of hardnesses of the saw blades in the as-quenched condition and the hardnesses after being subjected to high-temperature service conditions, the saw blades of the present invention (C, D, E, F, and G) exhibited a far greater resistance to softening than did the conventional saw blades (A and B). This property of the saw blades of the invention provides them with resistance to wear at the high temperatures prevailing during service.

TABLE V

| Steel | As quenched hardness, $R_c$ | Hardness after tempering 8 hours at 1,050 F., $R_c$ | Loss in hardness, $R_c$ |
|---|---|---|---|
| A | 59 | 25 | 34 |
| B | 59 | 31 | 28 |
| C | 53 | 34 | 19 |
| D | 52 | 40 | 12 |
| E | 52 | 40 | 12 |
| F | 54 | 44 | 10 |
| G | 54 | 41 | 13 |

To demonstrate the excellent performance of the saw blades of the present invention, particularly when compared with conventional saw blades, actual and comparable hot-metal sawing was performed using conventional saw blades of steels A and B and a saw blade of the present invention made from steel C. The results are shown in Table VI.

TABLE VI

| Steel | Blade heat treatment | Additional tooth treatment | Blade life ratio |
|---|---|---|---|
| A | OQ & T [1] 30/35 $R_c$ | None | 1.0 |
| A | OQ & T 30/35 $R_c$ | FH [2] 55/60 $R_c$ | 2.3 |
| B | OQ & T 35/39 $R_c$ | None | 1.0 |
| B | OQ & T 35/39 $R_c$ | FH 55/60 $R_c$ | 3.0 |
| C | OQ & T 30/35 $R_c$ | FH 47/52 $R_c$ | 12.0 |

[1] Oil quenched and tempered.
[2] Flame hardened.

From the comparative data presented in Table VI, it may be seen that the blade life of the saw blade of steel C was drastically longer than that of the conventional saw blades. In fact, the saw-blade life is far beyond that which would be expected from the mechanical-property data presented in Tables III through V. This unexpectedly drastic improvement in blade life is believed to result from the resistance of the saw blades of the invention to welding of hot-metal chips from the metal workpiece being cut. In the conventional saw blades of steels A and B, this welding occurred relatively early in the life of the saw blades and resulted in a rapid softening of the blade teeth, caused by localized overheating, and loss of sawing action. In the saw blades of steel C, the blade teeth were characterized by a substantial resistance to this welding action throughout the entire service life of the blade and retention of the original hardness. This unexpected resistance to welding of hot metal chips is believed to be caused by the formation, on the surface of the blade teeth during service, of a tightly adherent, high-temperature formed, complex refractory film. Heating the blade teeth at a temperature of about 1000 F. was found to be sufficient to initially form this film. Although this film is subjected to wear during service, the film is reformed at the elevated temperatures produced on the surfaces of the teeth during metal sawing. This film is composed primarily of $(FeNi)_3N$, $Fe_2O_3$ (gamma) and $(CrFe)_2O_3$ in order of decreasing magnitude, with minor amounts of $FeNiO_3$, $Fe_2O_3$ (alpha), $Fe_3O_4$, and CrO, not necessarily in order of decreasing magnitude, and other refractory compounds dependent on trace and residual elements in the steel.

To substantiate the beneficial effect of the refractory film, as described above, the saw blades of steels B and C were tested for hardness after use. The hardness of the flame-hardened teeth of the saw blade of steel B was in the range of 30 to 35 $R_c$ after the sawing tests reported in Table IV, whereas the hardness of the flame-hardened teeth of steel C were still on the order of 48 $R_c$, even after a fourfold greater amount of sawing than the saw blade of steel B.

It may be seen, therefore, that saw blades produced in accordance with this invention are characterized by a service life far beyond that which would be expected from a knowledge of the mechanical properties of the material from which the blades are produced. The formation during service of the above-described refractory film on the blade teeth constitutes a beneficial phenomenon that is not only absent in the use of conventional saw blades but is, in addition, a totally unexpected result with respect to the steel from which the saw blades of the present invention are made.

Although specific examples of the invention have been described herein, it is obvious that other adaptations and modifications may be made by those skilled in the art without departing from the spirit and scope of the following claims.

What is claimed is:

1. A circular, disc-shaped saw blade for use in sawing metal and having circumferentially spaced cutting teeth consisting essentially of, in percent, 0.20 to 0.60 carbon, 0.20 to 0.80 manganese, up to 1.00 silicon, 2.00 to 4.00 nickel, 0.75 to 2.00 chromium, 0.20 to 1.00 molybdenum, up to 0.30 vanadium, and the balance iron, and having a complex refractory film including $(FeNi)_3N$, $Fe_2O_3$, and $(CrFe)_2O_3$ formed thereon by heating to a temperature of at least 1000 F. whereby said refractory film resists welding to said teeth by hot metal chips from the metal workpiece being cut.

2. The saw blade of claim 1 having cutting teeth consisting essentially of, in percent, 0.25 to 0.50 carbon, 0.20 to 0.50 manganese, up to 1.00 silicon, 3.00 to 3.75 nickel, 1.00 to 1.60 chromium, 0.25 to 0.70 molybdenum, up to 0.30 vanadium, and the balance iron.

References Cited

UNITED STATES PATENTS

| 2,676,098 | 4/1954 | Payson | 75—128.9 |
| 3,115,406 | 12/1963 | Balass | 75—128.9 X |
| 3,165,402 | 1/1965 | Finkl | 75—128.9 X |
| 3,166,407 | 1/1965 | Knoth | 75—128.9 X |

HYLAND BIZOT, Primary Examiner

U.S. Cl. X.R.

29—103, 195; 30—167; 143—133